(12) United States Patent
    Paine

(10) Patent No.: US 6,674,023 B2
(45) Date of Patent: Jan. 6, 2004

(54) METHOD AND APPARATUS FOR WEIGHING RAILROAD CARS

(76) Inventor: Alan Paine, 276 E. Arrow Hwy., San Dimas, CA (US) 91791

(*) Notice: Subject to any disclaimer, the term of this patent is extended or adjusted under 35 U.S.C. 154(b) by 197 days.

(21) Appl. No.: 09/990,933

(22) Filed: Nov. 13, 2001

(65) Prior Publication Data

US 2003/0089530 A1 May 15, 2003

(51) Int. Cl.[7] .................... G01G 19/52; G01G 21/22
(52) U.S. Cl. .................... 177/132; 177/163; 177/211
(58) Field of Search .................... 177/163, 132, 177/211, 229

(56) References Cited

U.S. PATENT DOCUMENTS

| | | | | |
|---|---|---|---|---|
| 3,592,278 A | * | 7/1971 | Shumaker | 177/132 |
| 3,780,817 A | * | 12/1973 | Videon | 177/211 |
| 4,416,342 A | * | 11/1983 | Snead | 177/163 |
| 5,327,791 A | * | 7/1994 | Walker | 177/211 |

FOREIGN PATENT DOCUMENTS

JP          63-286725 A    * 11/1988     ............ 177/163

* cited by examiner

Primary Examiner—Randy Gibson
(74) Attorney, Agent, or Firm—J. E. Brunton, Esquire

(57) ABSTRACT

A method and apparatus for determining the weight of each axle of a plurality of rail cars of a railroad train passing over a selected section of a railroad track. The apparatus embodies a measuring device that, when mounted to the selected section of the railroad track, measures strain induced in a portion of the track as the rail car passes over that portion of the track to produce an electrical output which is precisely proportional to the load imposed on the portion of the track as each axle of the rail car passes over the portion of the track. The measuring device of the interfaces with a remotely located data processing subassembly that receives the output from the strain gauges and precisely determines the axle weight therefrom.

18 Claims, 5 Drawing Sheets

METHOD AND APPARATUS FOR WEIGHING RAILROAD CARS

BACKGROUND OF THE INVENTION

1. Field of the Invention

The present invention relates generally to weight measuring devices. More particularly, the invention concerns a method and apparatus for determining the axle weight of a railroad car by sensing the deflection in portions of the rails of the railroad track over which the railroad car is passing.

2. Discussion of the Invention

It has been a common practice in the past to use load cells for measuring the weight of various types of articles or materials, such as those contained within tanks and hoppers. Such measurements have typically been accomplished through the use of load cells that are positioned beneath the article to be weighed. However, in order to install the load cells, the article must generally be raised and, in the case of tanks and hoppers, in many instances, the legs of the tank or hopper must be cut or otherwise structurally modified in order to install the load cells. For these reason, the use of conventional load cells for such weighing operations is undesirable and can result in rather substantial expenditures, inconvenience, and time delays in the installation of the load cells.

Another prior art approach sometimes used for measuring the weight of articles or materials contained within supporting structures involves the use of strain gauge devices that are mounted within drilled holes formed in the structural members of the supporting structure. In such instance, the strain gauges are adapted to measure the deformation of the hole in the structural member as the load is increased. Typically the installation of such strain gauge devices is difficult and the reliability of such measurements is frequently suspect.

To overcome the drawbacks of prior art measuring systems of the character described in the preceding paragraphs, the present inventor developed a novel clamp-on structural strain gauge sensor that can be mounted to dynamic load bearing structures such as sucker-rod type oil well pumps to produce an electrical output proportional to the deflection of the structures. This novel strain gauge measuring apparatus is disclosed in U.S. Pat. No. 5,423,224 issued to the present inventor. Because of the pertinence of this patent to an understanding of the present invention, U.S. Pat. No. 5,423,224 is hereby incorporated by reference as though fully set forth herein.

In one embodiment of the invention described in U.S. Pat. No. 5,423,224, the strain measuring apparatus of the invention can be used in conjunction with conventional weighing instrumentation such as a Weigh Meter and has the ability to convert the analog signal from the strain gauge apparatus to a digital signal for processing and correction and then to reconfigure the data back to analog signals for input to the Weigh Meter.

As will be better understood from the discussion of which follows, the method and apparatus of the present invention makes use of a somewhat similar strain gauge sensors to those described in U.S. Pat. No. 5,423,224 to precisely determined the weight of each axle of each of the rail cars of a railroad train passing over the section of railroad track to which the strain gauge sensors have been interconnected.

SUMMARY OF THE INVENTION

It is an object of the present invention to provide a method and apparatus for determining the weight of each axle of a plurality of rail cars of a railroad train passing over a selected section of a railroad track.

Another object of the invention is to provide an apparatus of the aforementioned character which embodies a portable measuring device that, when clamped to the selected section of the railroad track, measures strain induced in a portion of the track as the rail car passes over that portion of the track to produce an electrical output which is precisely proportional to the load imposed on the portion of the track as each axle of the rail car passes over the portion of the track.

Another object of the invention is to provide an apparatus of the character described that readily interfaces with a remotely located data processing subassembly that receives the output from the strain gauges and precisely determines the axle weight therefrom.

Another object of the invention is to provide an apparatus as described in the preceding paragraphs, which is completely portable and can be quickly and easily interconnected with each rail of the railroad track by relatively unskilled workers using conventional tools.

Another object of the invention is to provide an apparatus of the class described which includes sensor means for first sensing the proximity of the wheels of the rail car to the sensors that are connected to the track and for then activating the strain gauge sensors to measure deflection in the rails caused by the rail car passing thereover.

Yet another object of the invention is to provide a method and apparatus of the character described which enables the precise measurement of each axle of each rail car of the railroad train as the train moves along the track without requiring that the train be stopped at the sensor locations.

Still another object of the invention is to provide a method and apparatus of the character described which includes novel calibration means for on site calibration of the apparatus.

In summary, the foregoing objects of the invention are achieved through the use of a strain gauge sensors that are removably connected to sections of the rails of the railroad track over which the rail cars pass through the use of proximity sensor means for sensing the proximity of the wheels of a rail car to the strain gauge sensors to produce an electrical output proportional to the deflection of the sections of the rails caused by the passage of the rail car thereover; and through the use of a data processing subassembly, which the electrical output is transmitted to convert the electrical output into the weight of the axle of the rail car passing over selected the sections of the railroad track.

DESCRIPTION OF THE INVENTION

Figure 1:
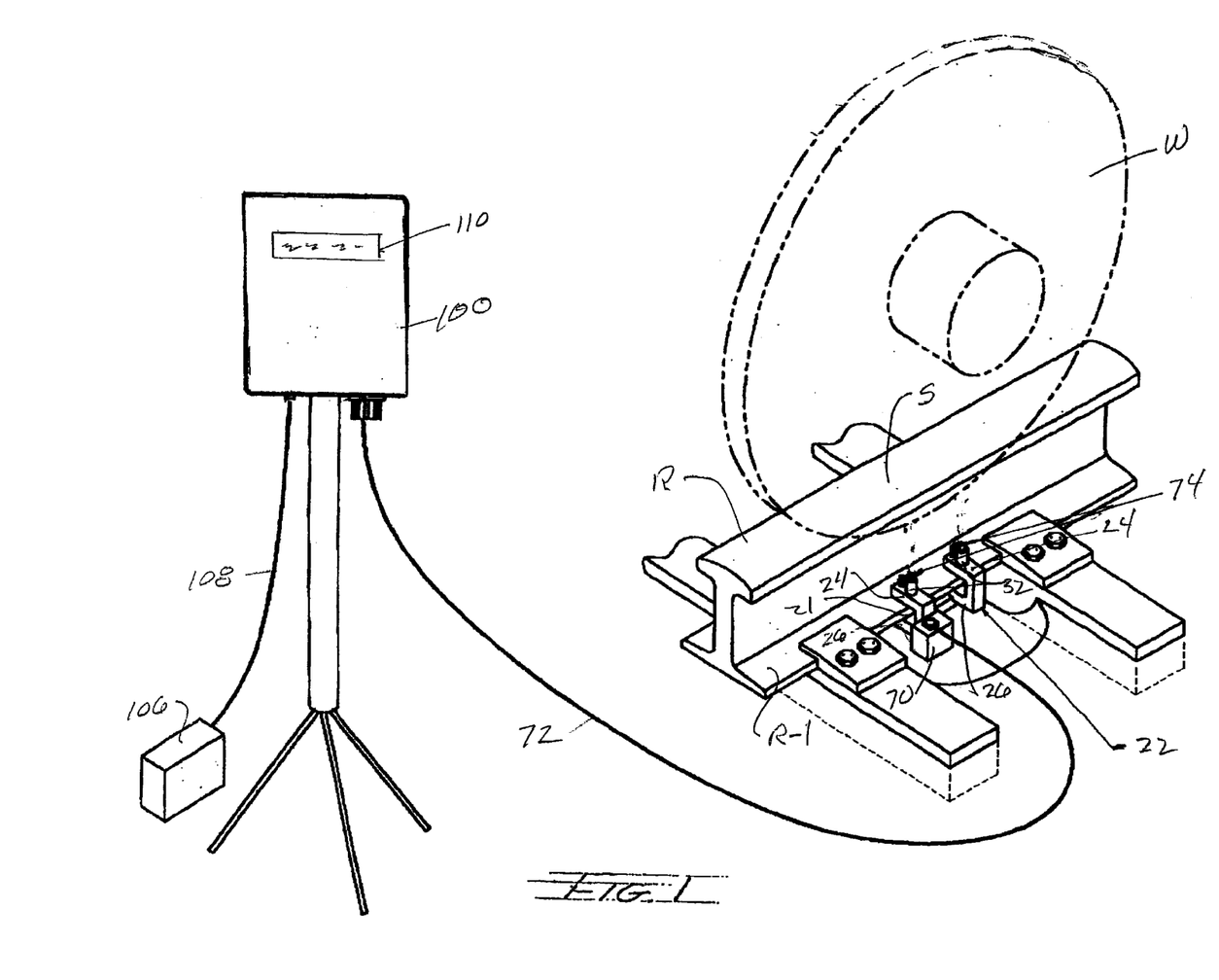
FIG. 1 is a generally perspective, diagrammatic view of one form of the apparatus of the invention showing one of the two strain gauge measuring devices of the apparatus connected to a section of one of the rails of a railroad track.
Figures 2, 3:
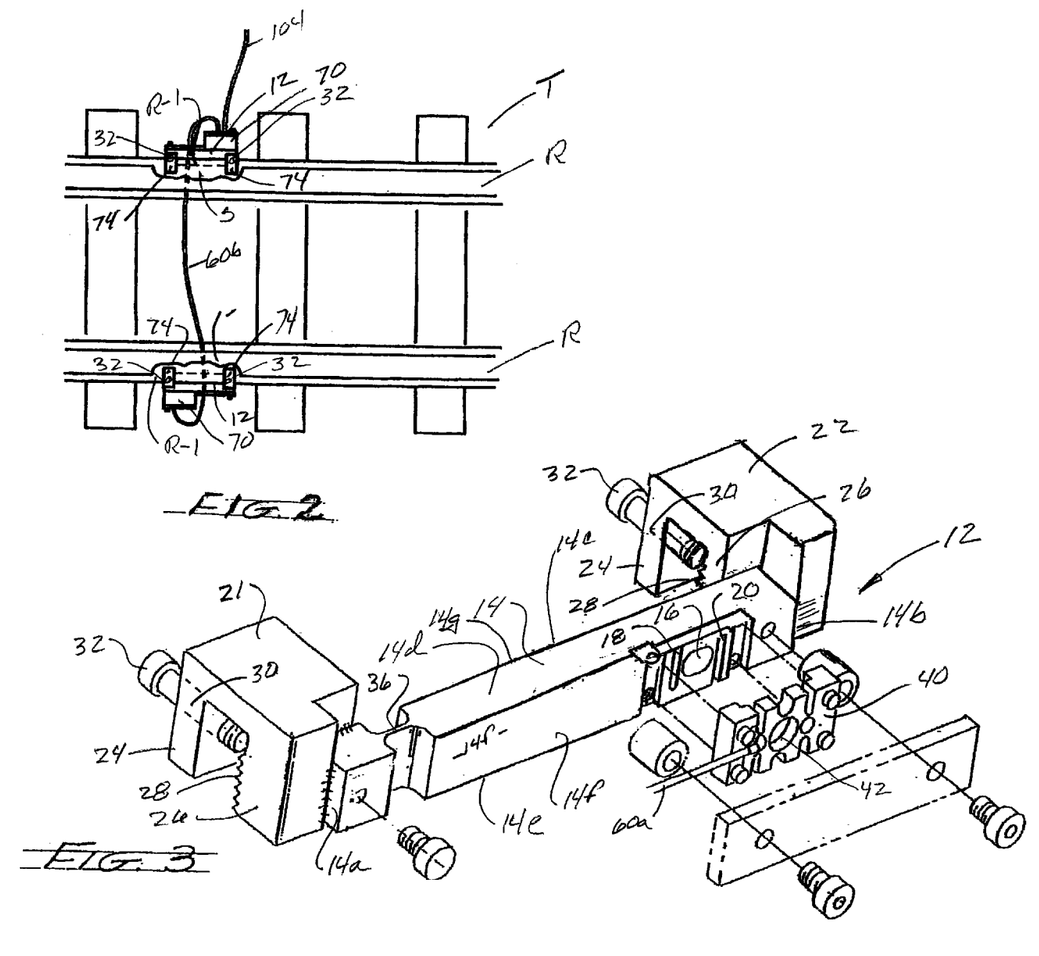
FIG. 2 is a generally plan view showing the interconnection of the two strain gauge measuring devices of the invention with the rails of a conventional railroad track.
FIG. 3 is a generally perspective view of a portion of the strain gauge measuring device that is shown interconnected with the rails of a railroad track in FIGS. 1 and 2.

Referring to the drawings and particularly to FIGS. 1, 2 and 3, one form of the apparatus of the invention for determining the weight of an axle of a railroad car is there illustrated. As depicted in FIGS. 1 and 2, the strain gauge measuring components of the apparatus of the invention, the details of construction of which will presently be described, are designed to be detachably interconnected with the rails "R" of a conventional railroad track "T". As previously mentioned, the strain gauge measuring, components of the apparatus are similar in construction and operation to those described in U.S. Pat. No. 5,423,224 issued to the present inventor.

The apparatus of the present form of the invention comprises four main subsystems, namely a pair of identical deflection collector base subassemblies, generally designated in FIGS. 2 and 3 by the numeral 12, a pair of identical first sensor means for sensing deflection in a flexure areas of base members 14 which forms a part of the deflection collector base subassemblies, a pair of spaced apart proximity sensor means connected to each of the deflection collector base subassemblies and data processing means for processing the data received from various the sensor means. As best seen in FIG. 3, base member 14 of each of the identical deflection collector base subassemblies of the first and second strain measuring devices comprises an elongated, bar-like member having first and second ends 14a and 14b and an intermediate portion 14c. Forming a part of intermediate portion 14c of the base member is a first flexure area 16. First flexure area 16 is located between two longitudinally, spaced-apart slots 18 and 20. Slot 18 extends downwardly from surface 14d of member 14 while slot 20 extends upwardly from surface 14e of member 14. The function of the first flexure area 16 will presently be described.

Provided proximate ends 14a and 14b of each of the base members 14 are clamping means for clamping the deflection collector base to the lower surface of the base flange "R-1" of one of the rails "R" of a railroad track "T" (FIG. 1). The clamping means of the present form of the invention comprises first and second clamping members 21 and 22 respectively which are interconnected with ends 14a and 14b respectively of each of the base members 14. Each of the clamping members 21 and 22 include first and second spaced apart jaws 24 and 26 between which the flange "R-1" of one of the rails is closely received. Each jaw 26 is provided with a multiplicity of gripping protuberances or teeth 28 and each is provided with a threaded aperture 30 that is adapted to threadably receive a threaded bolt 32 which here forms a portion of the clamping means of the invention for urging the flanges "R-1" into clamping engagement with teeth 28 of jaws 26.

In the form of the invention illustrated in FIG. 3, the intermediate portion 14c of base member 14 is also provided with a second flexure area 34 which comprises a thin wall 36 that is disposed between first and second cut-out portions 38 and 39 formed in the top and bottom walls 14f and 14g of member 14.

Figure 4:
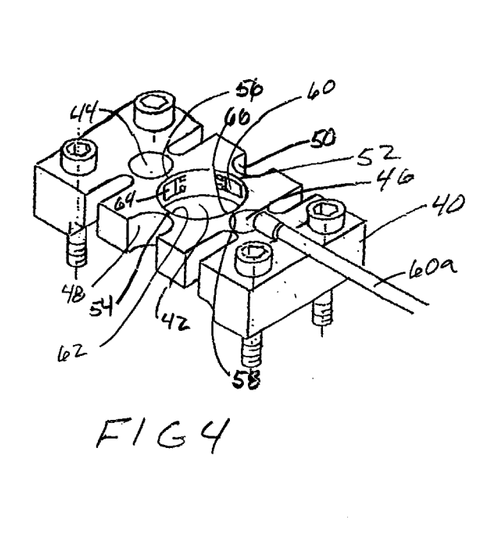
FIG. 4 is a greatly enlarged, generally perspective view of the sensor base of the strain gauge measuring device shown in FIG. 3.

Turning particularly to FIGS. 3 and 4, the first sensor means of the invention for sensing deflection in elongated base member 14 and for providing to the data processing means a deflection signal corresponding to this deflection, comprises a sensor base 40 which is preferably formed from a section of stainless steel plate. Sensor base 40 is provided with a plurality of cutout portions, which define a plurality of thin wall areas to which foil strain gauges are affixed in a manner now to be described.

As shown in FIG. 4, sensor base 40 is provided with a central aperture 42 and a pair of apertures 44 and 46, which are, located on either side of central aperture 42. Provided in the top and bottom walls 40a and 40b respectively of base 40 are semi-circular, cutout portions 48 and 50. These cutout portions form in conjunction with central aperture 42 first and second thin-wall portions 52 and 54 respectively. Formed between apertures 44 and 46 and central aperture 42 are third and fourth thin-wall portions 56 and 58 respectively. The previously identified, circumferentially spaced, strain gauge sensors are interconnected with sensor base 40 in these thin-wall areas. More particularly, a first sensor 60 is affixed proximate thin-wall portion 52 and a second sensor 62 is affixed proximate thin-wall section 54. Similarly, a sensor 64 is affixed proximate thin-wall section 56 and a sensor 66 is affixed proximate thin-wall section 58 (see also FIG. 3). Each of the sensors 60, 62, 64 and 66, which comprises a foil strain gauges of a character that is readily commercially available, are bonded to the thin-wall sections of the sensor base with an appropriate adhesive such as an epoxy and are heat cured in position. The foil strain gauges may be platinum, tungsten/nickel, and chromium and are commercially available from various sources including Muse Measurements of San Dimas, Calif.

Figure 5:
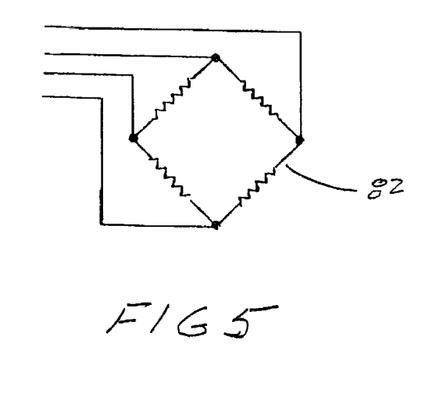
FIG. 5 is a generally diagrammatic view of a the manner of interconnection of strain gauges which form a part of the strain gauge measuring devices of the invention.

As best seen in FIG. 5, each of the thin-foil strain gauges are then wired in a typical Wheatstone bridge configuration there shown. Thin-wall portions 52, 54, 56 and 58 of base 40 respond to tension and compression loading across their length. The load varies depending upon the deflection transmitted from the rails "R" through base member 14 to the sensor means or strain gauges 60, 62, 64, and 66. The strain gauges are highly sensitive and the range of force needed to deflect the sensor may be, for example, between zero and approximately 50 pounds. Signal output and deflection is approximately 0.00025 inches of deflection equaling 0.10 MV/V. As illustrated in FIGS. 1 and 4, the sensor itself is wired via a connector 60a to a watertight junction box or housing 70. As shown in FIG. 2, the two sensor subassemblies are operably interconnected by a connector wire 60b that passes between the tracks. In similar manner, the data receiving means of the invention is connected to the sensor subassemblies via a connector 72 that runs to junction box 70 (FIG. 1).

Forming an important aspect of the apparatus of the invention is energizing means that is operably associated with the first sensor means of each of the strain gauge measuring devices for energizing the first sensor means when the wheels of the rail car are positioned over predetermined sections "S" of the rails "R" that are located directly above elongated base members 14. In the present form of the invention, the energizing means comprises second sensor means for detecting the proximity of rail car wheels "W" to the sections "S" and for then generating and transmitting appropriate signals to activate and deactivate the first sensor means. As illustrated in FIGS. 1 and 2, the second sensor means here comprise a pair of sensors 74 that are positioned on jaws 21 and 20 proximate bolts 32. As will later be described, in an alternate form of the invention the energizing means takes the form of a single sensor that is affixed to each rail intermediate the gripping jaws (see FIG. 7). Various types of readily commercially available proximity sensors well known to those skilled in the art are suitable for use as sensors 74. By way of non-limiting example, one well-known type of proximity sensor is the eddy current killed oscillator, or ECKO, which utilizes an oscillator that generates a radio frequency, or RF field, at the face of the sensor. Together, the oscillator and the sensor form a tuned circuit, which oscillates at a predetermined frequency. When a metallic object, or target, is moved toward the face of the sensor, eddy currents are established in the target as a result of the oscillating magnetic field. The development of these eddy currents causes the oscillations to diminish in amplitude, or be killed. Typically, an integrator converts the sine wave signal, which is generated by the oscillator, into a DC signal. The DC signal, which varies in amplitude with the amplitude of the oscillator, is sensed by a device, such as a Schmitt trigger, and converted into a digital signal. The digital signal represents the presence or absence of a metallic target in the region of the sensor face. However, it is to be understood that a number of different types of readily commercially available sensors, other than the ECKO sensor can be used to for the present application. Such sensors include inductive type sensors, which are readily commercially available from a number of sources such as the GRANGERS COMPANY.

Figure 6:
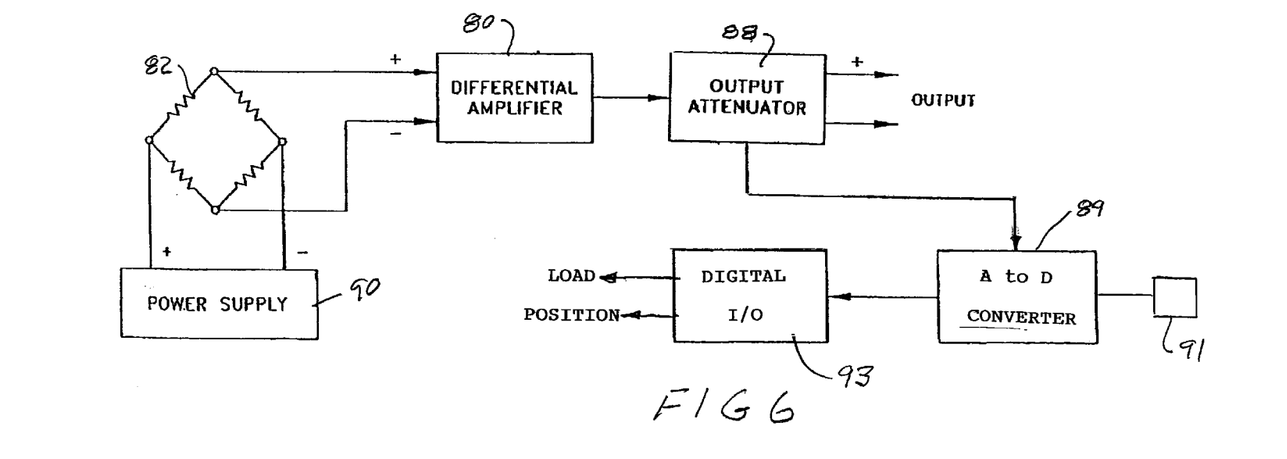
FIG. 6 is a generally schematic, block diagram of the various electronic components of the apparatus used for measuring deflection of the rails of the railroad track.

Turning now to FIG. 6, a differential amplifier 80 is shown connected to the bridge configuration 82 shown in FIGS. 5 and 6. The differential amplifier provides gain so that succeeding stage's noise contributions are negligible and function to filter out high frequency signals from sources such as vibration, which could affect the output, offset set point. Connected to differential amplifier 80 is an output attenuator 88 that attenuates the output from the differential amplifier so that the total gain from the differential amplifier is several times that of the signal out of load sensors. Connected to the output attenuator is an A to D converter 89 that forms a part of the data processing means of the invention.

Connected to and powering the Wheatstone bridge 82 is a power supply 90, which is also readily commercially available. Reference should be made to incorporated by reference U.S. Pat. No. 5,423,224 for a more detailed discussion of the electrical circuitry of the first strain measuring devices and for a more detailed discussion of the operation of these devices.

In accordance with the method one form of the invention, a portion of the soil and gravel beneath each of the rails of the railroad track is excavated to form a cavity having a depth of about six inches and width slightly greater than the width of the strain measuring devices. This done, the strain measuring device is interconnected to the flange "R-1" of each of the rails in the manner shown in FIG. 2. This interconnection step is accomplished by positioning the clamping members 21 and 22 over the rail flanges "R-1" so that a portion of each of the flanges is received between each of the jaws 24 and 26 of the two strain measuring device. This done the then upstanding bolts 32 are tightened to bring the top surfaces 14g of each of base members 14 into pressural engagement with the lower surface of each of the flange R-1 of the rails of the spaced-apart rail "R".

With the two strain measuring devices thusly interconnected with the spaced-apart rails, in the manner shown in figure 21, the devices are interconnected together by means of connector cable 60b (FIG. 2). Next the operably interconnected strain gauge measuring devices are operably interconnected by means of connector cable 72 with the remotely located data processing means, which is generally designated in FIG. 1 by the numeral 100. This done the data processing means 100 is energized by means of a suitable power source such as a battery 106 that is interconnected with the data processing means by a cable 108 (FIG. 1). Data processing means 100 comprises a suitably programmed, commercially available computer and includes a display means 110 that is operably associated with the computer for displaying information such as axel weight, axel number and the like.

With the apparatus interconnected in the manner shown in the drawings and as described in the preceding paragraphs, as each wheel of the railroad car passes along the rails, the proximity of the wheel will first be sensed by the proximity sensors 74 located closest to the direction of approach the wheel "W" and a suitable signal will be transmitted to the data processing means. The data processing means upon receiving the signal from the proximity sensors will appropriately energize the first sensor means. With each of the wheels "W" of one of the rail car axles positioned over the central section of the rails the deflection of the members 14 of each of the first sensor means caused by the weight of the wheels passing over the section will be sensed by the first sensor means and an electrical signal corresponding to the sensed deflection will be transmitted to the data processing means 100. As the wheel "W" continues to roll along the track, its position will be sensed by the second proximity sensed sensor 74 and a signal will be sent to the data processing means that will result in the appropriate deactivation of the strain gauge measuring devices.

In a manner will understood by those skilled in the art, the electrical signals transmitted from the first and second strain measuring devices to the data processing means 100 will be summed and processed by the computer component thereof used to accurately determine from the signal received the weight of the axle of the railroad car carrying the wheels "W" that have passed over the central section "S" of the rails of the railroad track. It is to be noted that because of the strategic positioning, the first and second sensor means of the invention and, due to their cooperation with the data processing means, accurate measurements of the weight of each of the axles of the train can sequentially be made without the necessity of stopping the train.

Figure 7:
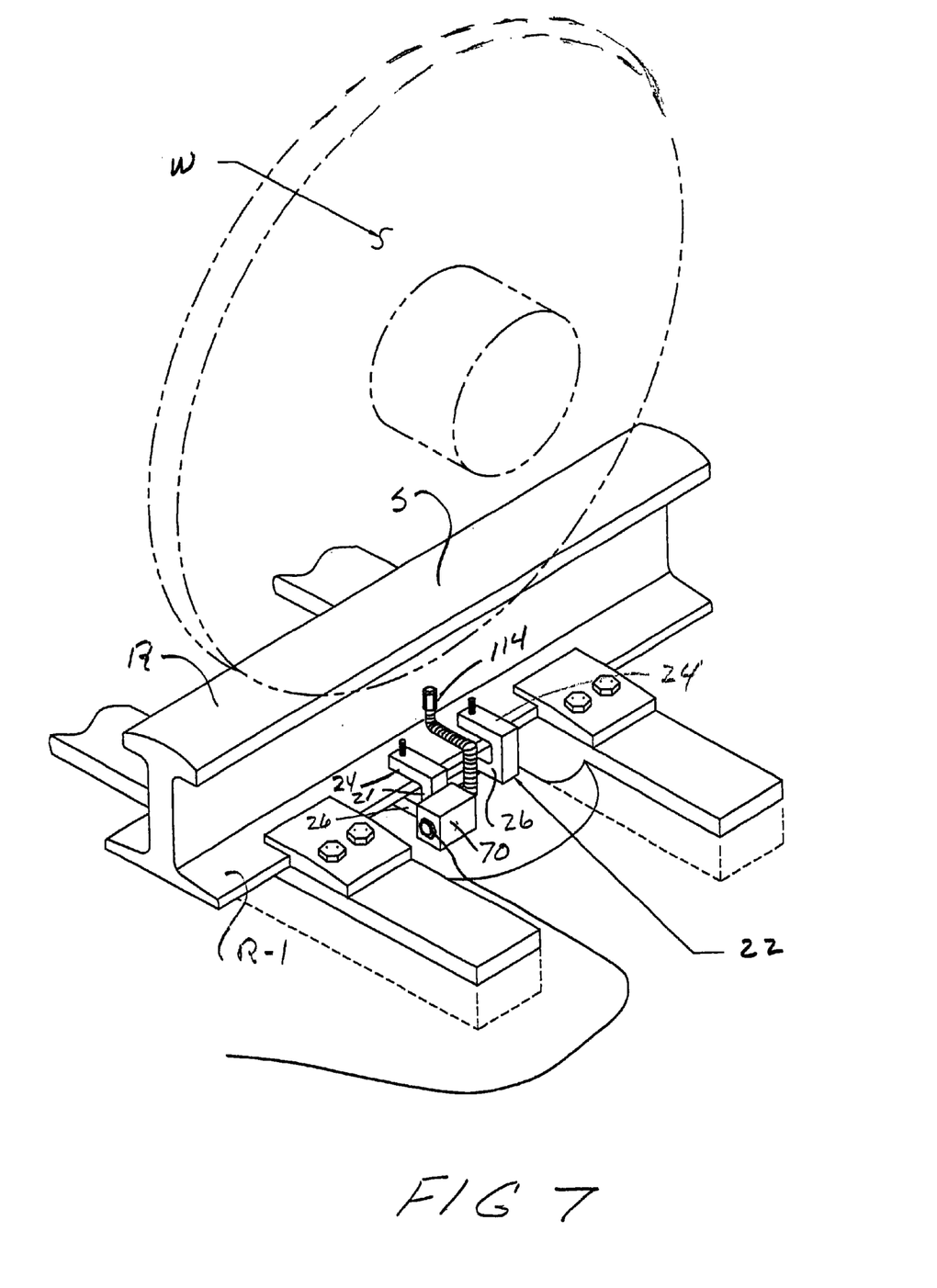
FIG. 7 is a generally perspective, diagrammatic view, similar to FIG. 1, but showing an alternate form of the apparatus of the invention illustrating one of the two strain gauge measuring devices of the apparatus connected to a section of one of the rails of a railroad track.

Turning to FIG. 7, the previously mentioned alternate form of the invention is there are shown. This form of the invention is similar in many respects to that previously described and like numerals are used in FIG. 7 to identify like components. The primary difference between this latest embodiment and the earlier described embodiment resides in the character of the energizing means that is operably associated with the first sensor means of each of the strain gauge measuring devices for energizing the first sensor means when the wheels of the rail car are positioned over predetermined sections "S" of the rails "R". In this latest form of the invention, the energizing means comprises a single sensor 114 that is affixed to each rail intermediate the gripping jaws. As before, sensor 114 can be selected from various types of readily commercially available proximity sensors well known to those skilled in the art.

With the apparatus interconnected in the manner shown in FIG. 7, as each wheel of the railroad car passes along the rails, the proximity of each of the wheels will be sensed by the proximity sensors and an appropriate signal will be transmitted to the data processing means. The data processing means upon receiving the signal from the proximity sensors will appropriately energize the first sensor means that are affixed to each of the tracks. With each of the wheels "W" of one of the rail car axles positioned over the central section of the rails, the rails along with members 14 of each of the first sensor means will be deflected by the weight of the wheels passing over the section. Each of the first sensor means will then cause an electrical signal corresponding to the sensed deflection to be transmitted to the data processing means 100 for processing in the manner previously discussed.

Figures 8, 9:
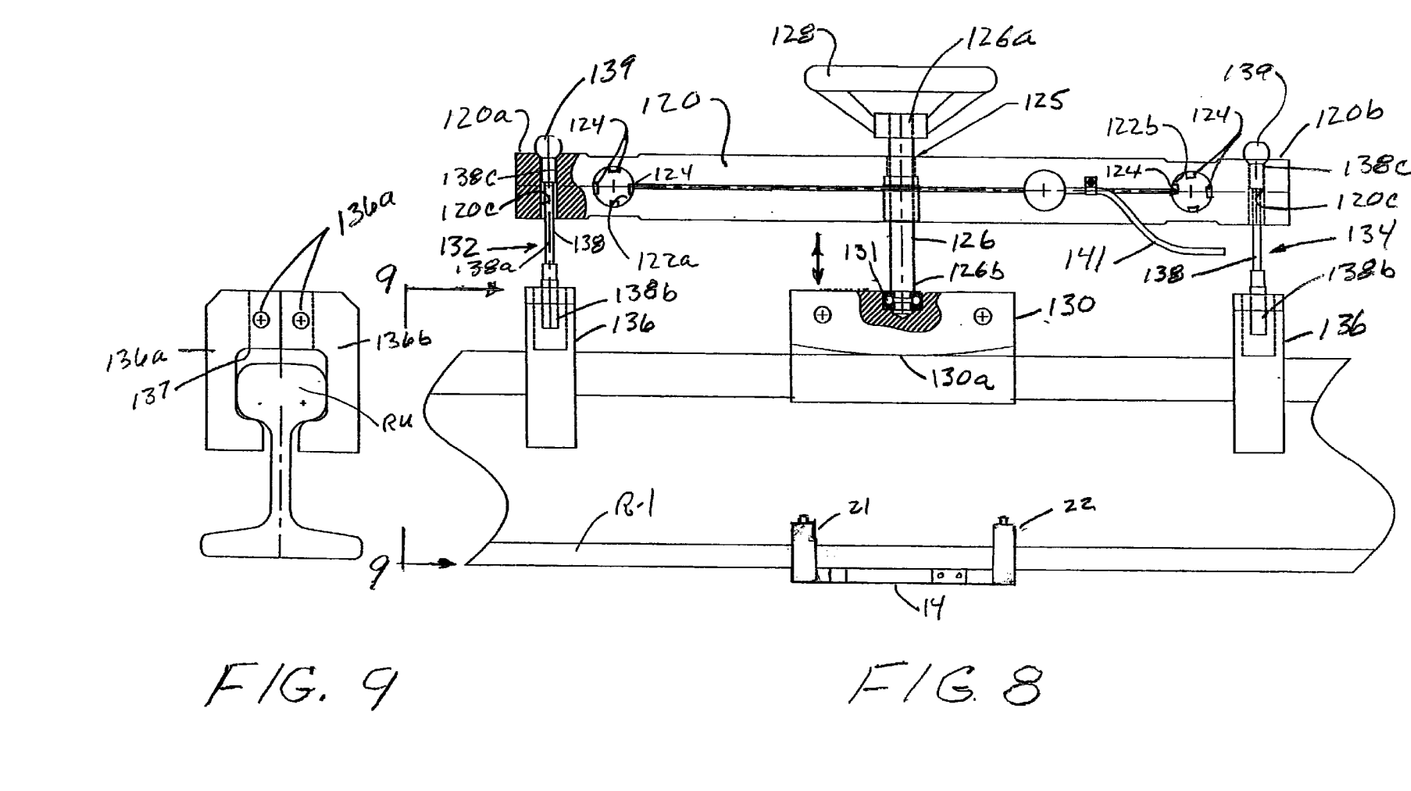
FIG. 8 is a fragmentary, side elevational view of one form of calibration device of the invention connected to a section of one of the rails of a railroad track.
FIG. 9 is a view taken along lines 9—9 of FIG. 8.

Turning next to FIGS. 8 and 9 of the drawings, the novel calibration means of the invention for calibrating the first sensor means is there shown connected to one of the pair of rails of the railroad tracks. This important calibration means here comprises a calibration base 120 having first and second ends 120a and 120b and first and second openings 122a and 122b formed proximate the first and second ends. Mounted within each of the first and second openings 122a and 122b is a plurality of strain gauges 124 for measuring the deflection of the calibration base 120. Strain gauges 124 are of a character well known to those skilled in the art and their installation and operation is well within the skill of the art.

Connected to calibration base 120 is pressure imparting means for imparting pressure to the rail and for controllably deflecting calibration base 120. The pressure imparting means here comprises a turn wheel assembly 125 that is connected to calibration base 120 intermediate first and second openings 122a and 122b. This important turn wheel assembly here includes a shaft 126 that is threadably connected to calibration base 120 in the manner shown in FIG. 8. The turn wheel assembly also includes a hand-engaging wheel 128 that is connected to the upper end 126a of shaft 126 for imparting rotation to the shaft.

The pressure imparting means of this form of the invention also includes a pressure imparting block 130 having a convex lower surface 130a that is disposed in engagement with the rails in the manner shown in FIG. 8. The pressure imparting block 130 is, in turn, operably interconnected with the lower end 126b of shaft 126 of the turn wheel assembly by means of a conventional bearing 131. In order to connect the calibration base to the rails of the railroad track, first and second connector assemblies 132 and 134 are provided proximate the ends of the calibration base. Each of the first and second connector assemblies comprises a connector yoke 136 and a connector cable 138 that extends between the connector yoke and the calibration base for connecting the connector yoke to the calibration base. More particularly, each of the connector cables 138 includes a flexible body portion of 138a that extends through a bore 120c provided in each end of calibration base 120. Flexible body portion 138a terminates in a lower portion 138b that is affixed one of the connector yokes and terminates in an upper portion of 138c that is connected to an anchoring sphere 139. As best seen in FIG. 9, each of the yokes 136 includes releasably interconnected side components 136a and 136b so that when the side components are interconnected in the manner shown in FIG. 9, they will cooperate to define an opening 137 that closely circumscribes the upper portion RU of the rail.

In using the calibration means of the invention, the apparatus is first connected to the rail in the manner shown in FIGS. 8 and 9. This done, the first sensor means is also connected to the rail by means of the clamping means (see, for example, FIG. 1). With the apparatus thusly in place, turning of turn wheel 128 will cause a downward pressure to be exerted on pressure imparting block 130. As the downward pressure is exerted on block 130, cables 138 will, of course, be tensioned so that as the rail is deflected, the calibration base 120 along with the sensor member 14 of the first sensor means will also simultaneously be deflected. The extend of deflection of the calibration base can be precisely determined by the strain gauges 124 that are inter connected with suitable external display means by electronic connector 141 (FIG. 8). Using the calibration apparatus, it is readily apparent that the amount of force or weight necessary to deflect the rail by a given amount can be readily determined. Once this information is known, the first sensor means of the apparatus of the invention can be calibrated in a manner such that the amount of deflection of the rails by the wheels of the railroad car can be equated to the weight of the railroad car that is causing the deflection of the rail. The aforementioned method of calibration is well understood by those skilled in the art and the calculations necessary to determine the amount of weight necessary to deflect the rails a given amount as measured by the calibration means and the first sensor means can be readily determined by those skilled in the art.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

What is claimed is:

1. An apparatus for determining the weight of an axle of a railroad car by measuring deflection in sections of a pair of rails of a railroad track caused by the wheels of a rail car passing over said sections comprising:

(a) a first strain measuring device connected to a section of one of said rails and a second strain measuring device connected to a section of the other of said rails, said first and second strain measuring devices being operably interconnected and each comprising:

(i) an elongated base member disposed in engagement with a section of rail, (ii) first sensor means for sensing deflection in said elongated base member and for producing a deflection signal corresponding to the deflection in said elongated base member;

(iii) clamping means connected to said elongated base member for releasably clamping said elongated base member to a section of rail;

(b) energizing means for energizing said first and second strain measuring devices when the wheels of the rail car are located over the sections of the pair of rails; and (c) data processing means operably associated with said first and second sensor means for receiving said deflection signals from said first sensor means and for analyzing said deflection signals to determine the weight of the portion of the rail car causing the deflection in said elongated base members.

2. The apparatus as defined in claim 1 in which said first sensor means of said first and second measuring devices comprises:

(a) a sensor base connected to said elongated base member, said sensor base having a plurality of cut-out portions defining a plurality of thin-wall areas in said sensor base;

(b) a plurality of foil strain gauges affixed to said sensor base proximate said thin areas; and (c) connector means for connecting said sensor base to said elongated base member proximate said first flexure area.

3. The apparatus as defined in claim 1 in which said clamping means of said first and second strain measuring devices comprises first and second clamping members integrally formed with said base member, each of said clamping members comprising first and second spaced apart jaws defining a rail receiving opening therebetween and means for urging at least one of said first and second jaws into clamping engagement with the rail.

4. The apparatus as defined in claim 1 in which said energizing means comprises a second sensor means operably associated with said first sensor means of each of said strain gauge measuring devices, said second sensor means being disposed proximate each said rail of said pair of rails for sensing the passage of the wheels of a rail car thereover.

5. The apparatus as defined in claim 1 in which said energizing means comprises a pair of second sensor means operably associated with said first sensor means of each of said strain gauge measuring devices, one of said pair of second sensor means being disposed proximate each said rail of said pair of rails for sensing the passage of the wheels of a rail car thereover.

6. The apparatus as defined in claim 1 in which said energizing means comprises a proximity sensor operably associated with said first sensor means of each of said strain gauge measuring devices and disposed proximate each said rail of said pair of rails for sensing the passage of the wheels of a rail car thereover.

7. The apparatus as defined in claim 1 in which said energizing means comprises a pair of spaced-apart proximity sensors operably associated with said first sensor means of each of said strain gauge measuring devices, one of said pair of spaced-apart proximity sensors being disposed proximate each said rail of said pair of rails for sensing the passage of the wheels of a rail car thereover.

8. The apparatus as defined in claim 7 in which said proximity sensors are connected to said clamping means of said first and second strain measuring devices.

9. The apparatus as defined in claim 7 in which said data processing means is located remotely from said first and second strain measuring devices and includes display means for displaying the weight of the portion of the rail car causing the deflection in said elongated base members.

10. An apparatus for determining the weight of an axle of a railroad car by measuring deflection in sections of a pair of rails of a railroad track caused by the wheels of a rail car passing over said sections comprising:
   (a) a first strain measuring device connected to a section of one of said rails and a second strain measuring device connected to a section of the other of said rails, said first and second strain measuring devices being operably interconnected and each comprising:
      (i) an elongated base member disposed in engagement with a section of rail,
      (ii) first sensor means for sensing deflection in said elongated base member and for producing a deflection signal corresponding to the deflection in said elongated base member said first sensor means comprising;
         a. a sensor base connected to said elongated base member, said sensor base having a plurality of cut-out portions defining a plurality of thin wall areas in said sensor base;
         b. a plurality of foil strain gauges affixed to said sensor base proximate said thin areas; and
         c. connector means for connecting said sensor base to said elongated base member;
      (iii) clamping means connected to said elongated base member for releasably clamping said elongated base member to a section of rail, said clamping means comprising first and second spaced apart jaws for gripping the section of rail;
   (b) energizing means operably associated with said first and second strain means for energizing said first and second strain measuring devices when the wheels of the rail car are located over the sections of the pair of rails; and
   (c) data processing means operably associated with said first and second sensor means for receiving said deflection signals from said first sensor means and for analyzing said deflection signals to determine the weight of the portion of the rail car causing the deflection in said elongated base members.

11. The apparatus as defined in claim 10 in which said spaced apart jaws define a rail receiving opening therebetween and in which said clamping means for urging at least one of said first and second jaws into clamping engagement with the rail.

12. The apparatus as defined in claim 10 in which said energizing means comprises a second sensor means operably associated with said first sensor means of each of said strain gauge measuring devices, said second sensor means being disposed proximate each said rail of said pair of rails for sensing the passage of the wheels of a rail car thereover.

13. The apparatus as defined in claim 10 in which said energizing means comprises a pair of second sensor means operably associated with said first sensor means of each of said strain gauge measuring devices, one of said pair of second sensor means being disposed proximate each said rail of said pair of rails for sensing the passage of the wheels of a rail car thereover.

14. The apparatus as defined in claim 10 in which said energizing means comprises a proximity sensor operably associated with said first sensor means of each of said strain gauge measuring devices and disposed proximate each said rail of said pair of rails for sensing the passage of the wheels of a rail car thereover.

15. The apparatus as defined in claim 10 further including calibration means connected to each of said pair of rails for calibrating said first sensor means.

16. The apparatus as defined in claim 15 in which said calibration means comprises:
   (a) a calibration base having first and second ends and first and second openings formed proximate said first and second ends;
   (b) a plurality of strain gauges mounted within each of said first and second openings for measuring deflection of said calibration base; and
   (c) pressure imparting means connected to said calibration base for imparting pressure to the rail and for controllably deflecting said calibration base, said pressure imparting means comprising:
      (i) a turn wheel assembly connected to said calibration base intermediate said first and second openings, said turn wheel assembly comprising a shaft threadably connected to said calibration base and a hand engaging wheel connected to said shaft for imparting rotation thereto;
      (ii) a pressure imparting block disposed in engagement with the rail and operably interconnected with said turn wheel assembly; and (iii) first and second connector assemblies for connecting said calibration base to said rail, each of said first and second connector assemblies comprising a connector yoke connected to the rail and a connector cable extending between said connector yoke and a said calibration base for connecting said connector yoke to said base member.

17. A method for determining the weight of an axle of a railroad car having rotating wheels using an apparatus comprising a first strain measuring device removably connected to a section of one of the rails by a clamping means and a second strain measuring device removably connected to a section of the other of the rails by a clamping means; energizing means operably associated with the first and second strain measuring devices for energizing the first and second strain measuring devices when the wheels of the rail car are located over the sections of the pair of rails; and data processing means operably associated with the first and second sensor means for receiving the deflection signal from the first sensor means and for analyzing the deflection signals to determine the weight of the portion of the rail car causing the deflection in the elongated base member, the method comprising the steps of:

(a) using the clamping means, connecting the first strain measuring device to a section of one of the rails and connecting the second strain measuring device to a section of the other of the rails;

(b) using the energizing means sensing the arrival of the wheels of the railroad car, at the section of the railroad track and then energizing the first and second strain measuring devices;

(c) using the strain measuring devices determining the deflection in each of sections of the railroad truck caused by the wheels rolling over the sections of the track; and (d) using the data processing means, determining the weight of the axle of the railroad car that is causing the measured deflection in the sections of the railroad track.

18. The method as defined in claim 17 in which the apparatus further includes calibration means for calibrating the first and second strain measuring devices and in which the method includes the further step of calibrating the first and second strain measuring devices following the interconnection of the strain measuring devices to the sections of the rails.

* * * * *